(12) United States Patent
Marttila et al.

(10) Patent No.: US 6,443,197 B2
(45) Date of Patent: Sep. 3, 2002

(54) CHAIN IN A SAWING DEVICE, AND A MOTOR-DRIVEN SAWING DEVICE

(75) Inventors: Mauri Marttila, Kehrontie; Harri Niemi, Linnustajankatu, both of (FI)

(73) Assignee: Plustech Oy, Tampere (FI)

( * ) Notice: Subject to any disclaimer, the term of this patent is extended or adjusted under 35 U.S.C. 154(b) by 0 days.

(21) Appl. No.: 09/834,398

(22) Filed: Apr. 13, 2001

(30) Foreign Application Priority Data

Apr. 17, 2000 (FI) .............................................. 20000910

(51) Int. Cl.$^7$ .............................................. A01G 23/08
(52) U.S. Cl. ..................... 144/34.1; 30/123.4; 30/379.5; 83/831; 83/928; 144/4.1; 144/335; 144/336
(58) Field of Search .................................. 144/4.1, 34.1, 144/335, 336; 83/831–834, 798; 30/123.4, 379.5

(56) References Cited

U.S. PATENT DOCUMENTS

| | | | |
|---|---|---|---|
| 2,589,015 A | 3/1952 | Merz ............................ | 30/383 |
| 4,378,719 A | 4/1983 | Burgess ........................ | 83/831 |
| 4,462,439 A | 7/1984 | Dagenais ..................... | 144/34.1 |
| 4,848,424 A | 7/1989 | Wiemeri et al. ........... | 144/34.1 |
| 5,979,518 A | 11/1999 | Hamby ........................ | 144/34.1 |

Primary Examiner—W. Donald Bray
(74) Attorney, Agent, or Firm—Quarles & Brady LLP

(57) ABSTRACT

A sawing device and a chain for it, comprising at least two adjacent sequences of connecting links, of which at least some are cutting teeth; and a sequence of drive links fitted between two adjacent connecting link sequences, wherein an opening at the rear end of the drive link is centered at an opening in the front end of the connecting links, wherein an opening in the front end of the drive link is centered at an opening of the rear end of the connecting links, and wherein a binding pin extending through the whole width of the chain is fitted in the openings. To increase the sawing width, a bush ring is fitted between two adjacent connecting link sequences, around the pin, and placed in the opening of the drive link, and on at least one side of said drive link, a collar is fitted whose diameter is formed greater than the opening in said drive link.

14 Claims, 3 Drawing Sheets

CHAIN IN A SAWING DEVICE, AND A MOTOR-DRIVEN SAWING DEVICE

BACKGROUND OF THE INVENTION

1. Field of the Invention

The invention relates to a chain for a sawing device. The invention also relates to a motor-driven sawing device.

2. Description of the Related Art

For the processing of tree trunks, there are known harvesting devices used, such as feller heads, which cut the tree trunk and grip it and fell it in a controlled manner. The head is normally fixed at the end of a boom assembly in a working machine which is movable on a terrain by means of wheels or a crawler. Such a device is disclosed in patent publication U.S. Pat. No. 5,979,518 in which the cutting is effected by means of a movable chain saw. For supporting the tree trunk, the head is also equipped with grapple means which can be swivelled in relation to a frame structure, normally pairwise on different sides of the tree trunk. A feller device without grapples is also known from patent publication U.S. Pat. No. 4,848,424, in which a sawing chain encircles a support plate moving in a linear manner in the frame. Another such device is disclosed in patent publication U.S. Pat. No. 4,462,439, in which the saw flange, encircled by the chain, is rotated around a vertical axis. The support plate and the saw flange support the tree trunk to be cut during the sawing. The cutting can also be executed with a rotating blade wheel, wherein known feller heads are equipped with a stationary plate above the blade wheel. The weight of the cut trunk is also supported on the plate during transfers. The edge of the blade wheel is provided with high teeth which cut a hole in the trunk for the blade wheel and the plate. The trunk is supported in a vertical position by means of grapple means.

For cutting of the trunk, the blade wheel of the sawing device must be made considerably larger than the diameter of the trunk, which results in a large mass and size. The heavy blade wheel is also slow to accelerate and to stop, wherein to speed up the working, the blade wheel is normally continuously in operation, which may lead to risk situations. During and after the cutting, the trunk is supported to the plate above the blade wheel, which plate must be made very strong. The slot to be sawn must be made wide, wherein the output capacity required of the device increases. The manipulation of the heavy and bulky feller head is very difficult.

Therefore, it is preferable to use a saw chain which can be installed in different ways to encircle various flange structures and whose mass is considerably smaller than that of a blade wheel. The chain can thus be rotated only when it is necessary and be stopped at other times, wherein the saw engine does not continuously drive pressurized medium in the working machine.

The tree trunk causes a considerable load on the supporting saw flange. The maximum thickness of the saw flange is determined by the width of the slot formed at the sawing point. The front edge of the saw flange, which also supports the saw chain, must not be thicker than the saw chain, to make the saw flange penetrate into the slot. The saw flange can also be wedge-shaped, but this increases the required feed force of the saw flange and may increase the forces effective on the saw chain. The result is, for example, that the size of tree trunks to be processed by the felling device must be limited.

SUMMARY OF THE INVENTION

It is an aim of the present invention to eliminate the drawbacks presented above and to provide a safe harvesting device. Another aim is to provide a sawing device with a sufficient service life, particularly for feller heads. In particular, an aim is to provide, by simple means, a widened chain which makes it possible to use a simple and durable flange structure in a sawing device. To achieve these aims, the chain for a sawing device according to the invention is presented. The motor-driven sawing device according to the invention is also presented.

The essential principle in the invention is particularly a widened chain and its assembly of primarily standard parts which are also used for assembling a normal-width chain for a sawing device. A considerable advantage is thus that said standard parts, particularly the links in the chain, are easily available parts, thereby reducing the manufacturing costs of the chain. Another advantage is that the necessary auxiliary parts are parts which are easy to manufacture at a low cost. It is not necessary to store several different links for different chain widths.

By applying the same principle, the chain can be made to have a desired width, wherein cutting teeth are provided at its whole width. By means of the wide saw chain, the sawing slot thus becomes wider for a thicker and stronger flange structure used as the support plate. The support plate can be made of a material having good gliding properties, and it can have an even thickness. The rigid flange structure is less sensitive for deformations which are due to loading and cause problems in the path of the chain.

To enlarge the slot, it is also possible to place, for example, two known chains next to each other. In this case, also the need for power supply is doubled. Problems are also caused by different wearing and separate tensioning of the chains. The slot and the saw flange become unnecessarily large, if the chains must be placed apart from each other to prevent collisions. By using the chain according to the invention, the width of the chain and thereby the slot can be changed in steps consisting of the width of two adjacent links. In this way, the structure of the saw flange does not become unnecessarily thick or complex.

BRIEF DESCRIPTION OF THE DRAWINGS

In the following, the invention will be illustrated with reference to the appended drawings, in which.

DETAILED DESCRIPTION OF THE INVENTION

Figure 1:
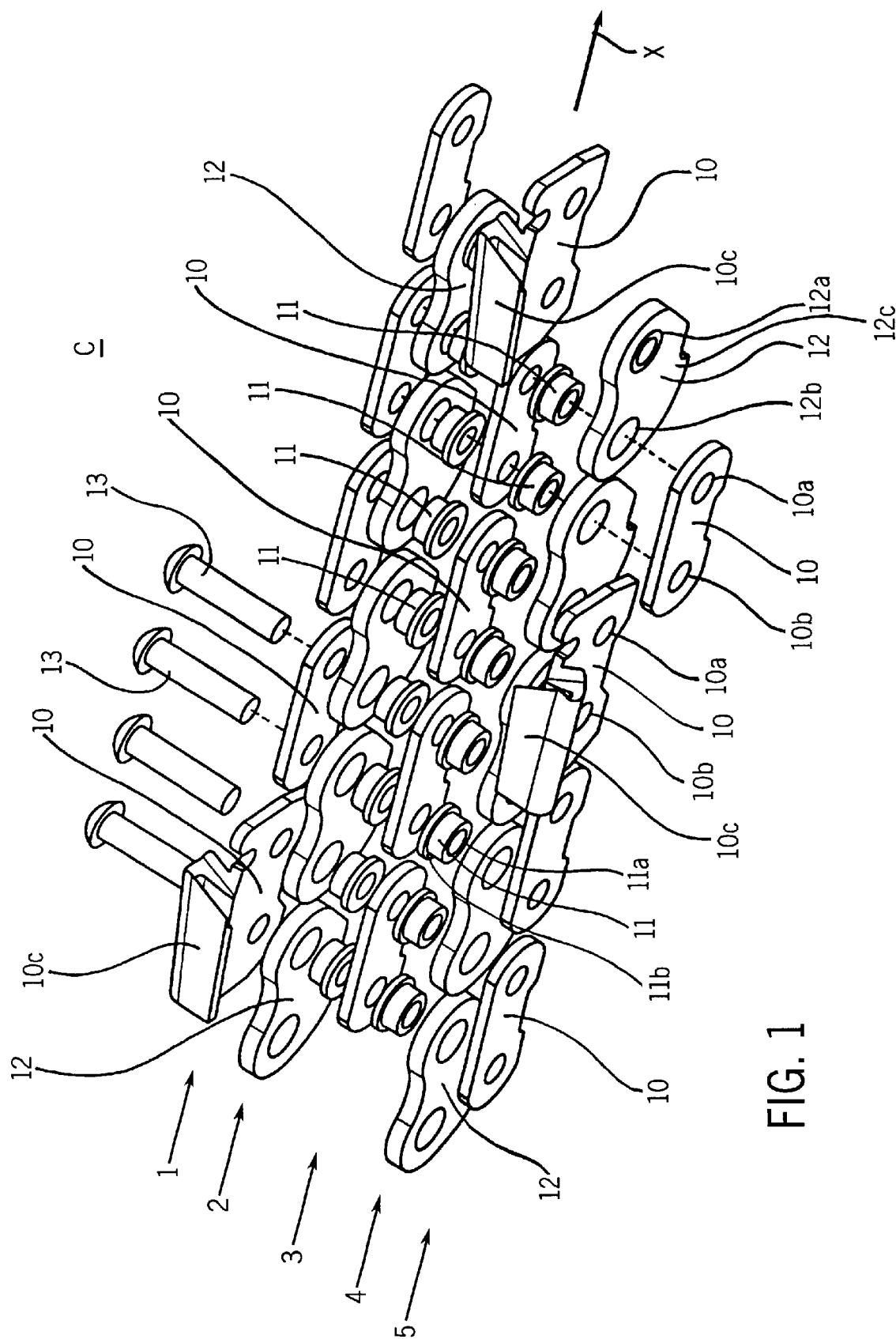
FIG. 1 shows, in a perspective view, a chain part according to an embodiment of the invention in an exploded view.

In FIG. 1, the chain C for a sawing device is only shown as a part with the length of five links, to illustrate the invention. When installed, the whole chain C constitutes a ring-like endless chain which is fitted around a saw flange structure (not shown in the figure). The rest of the chain C is formed in an iterative manner according to the principle shown in FIG. 1.

FIG. 1 shows a chain C according to a first advantageous embodiment of the invention, comprising three sequences of connecting links 10 fitted one after the other, i.e. a first sequence 1, a third sequence 3 and a fifth sequence 5. The connecting links 10 of the different sequences are aligned next to each other, wherein openings 10a in their front parts and openings 10b in their rear parts are aligned on the same transverse axes, respectively. The chain C is arranged to extend, driven by motor means, in the direction of the sequences (arrow X). Some of the connecting links 10 in the first sequence 1 are provided, at their upper parts, with a cutting tooth 10c. The connecting links 10 equipped with a tooth 10c are links known as such, their upper parts being provided with a control tooth preceding a gap and an upper plate after the gap, the front edge of the plate being sharpened in a right-handed or left-handed manner. These links are also called tooth links. In FIG. 1, the tooth links 10 of the sequences 1, 3 are left-handed, and the tooth link 10 of the sequence 5 is right-handed. The front end of the link 10 is provided with a first opening 10a for mounting, and the rear end is provided with a second opening 10b for mounting. The link 10, its lower part, is also provided with a toe part and a heel part which glide along the edge of the saw flange structure. Connecting links 10 equipped without teeth 10c are also links known as such.

The chain C also comprises two sequences of drive links 12, i.e. a second sequence 2 and a fourth sequence 4. Each sequence of drive links is placed between two sequences of connecting links. The drive links 12 of the different sequences are aligned next to each other, wherein openings 12a in their front parts and openings 12b in their rear parts are aligned on the same transverse axes, respectively. The drive links 12 are drive links known as such, their lower parts being provided with a root part 12c which is fitted to the groove of the saw flange and to which the motor means transmit the force that drives the chain C forward, normally by means of a drive wheel. The opening 12b in the rear part of the drive link 12 is centralized on the same axis with the opening 10a in the front part of a connecting link 10, and the opening 12a in the front part of the next drive link 12 is centralized on the same axis with the opening 10b in the rear part of the same connecting link 10. A pin 13, for example a binding rivet, extends through the openings 10a and 12b in the width direction to keep the chain C together. Said axes extend through the pins 13. FIG. 1 shows the pin 13 expanded at its one end only, but to bind and keep the chain C together, both ends of the pin 13 are expanded by pressing, compressing or hitting after it has been placed through the chain C.

By using standard links, known as such the openings 12a and 12b of the drive link 12 are equal in size but larger in diameter than the corresponding openings 10a and 10b in the connecting link 10. On the other hand, the openings 10a and 10b are equal in size. The diameter of the pin 13 is arranged to be substantially equal to the size of the openings 10a and 10b. The widening of the pin 13 is arranged to be larger than the openings 10a and 10b of the connecting links 10 outermost in the chain C.

According to the invention and to increase the sawing width, a bush ring 11 is fitted both between adjacent connecting link sequences 1, 3 and between adjacent connecting link sequences 3, 5. The bush ring 11 is arranged to fit a connecting link pair at a desired width and distance, which in the embodiment of FIG. 1 corresponds to the width of the bush ring 11. The connecting links 10 are supported towards the bush ring 11, wherein the outer diameter of the bush ring 11 is larger than the inner diameter of the opening 10a and 10b. The bush ring 11 is placed around the pin 13, wherein the inner diameter of the opening 11a of the bush ring 11 substantially corresponds to the outer diameter of the pin 13. The bush ring 11 is simultaneously placed within the opening 12a or 12b of the drive link 12, wherein the outer diameter of the bush ring 11 substantially corresponds to the inner diameter of said opening. In the presented embodiment, the drive link 12 and the bush ring 11 are freely rotated with respect to each other. One end of the bush ring 11 is provided with a collar 11b whose outer diameter is formed larger than the opening 12a and 12b of the drive link 12. To make the assembly possible, the opposite end of the bush ring 11 must fit in the opening of the drive link 12.

The particular purpose of the collar 11b is to fit the tooth link 10 of the sequence 3 and the drive link 12 of the sequence 2 at a determined distance from each other. The collar 11b is used to prevent the lower part of the tooth 10c, which is bent towards the drive link 12, and the upper edge of the drive link 12 from colliding with each other, when the chain is bent and passed around an idle wheel. When using standard links, a collision occurs if the links are fitted side by side against each other.

The connecting link 10 and the drive link 12 are placed on different sides of the collar 11b, wherein in the embodiment of FIG. 1, the width of the collar 11b substantially corresponds to the distance between the links. To allow free rotation of the drive link 12 around the bush ring 11, that part of the bush ring 11 which is placed inside the opening 12a or 12b of the drive link 12 is dimensioned to have a width which corresponds at least to the thickness of the drive link 12. At the same time, the movement of the drive link 12 in the direction of the pin 13 is prevented. The connecting links 10 of the sequences 1, 3 and 5, which are bound to each other with two pins 13, are pressed against each other in a fixed manner. The pin 13 and the bush ring 11 act as a kind of hinge, around which the drive links 12 are allowed to rotate freely. The drive links 12 also connect the connecting links with the next connecting links, wherein the chain C is also allowed to bend around the pin 13.

Figure 2:
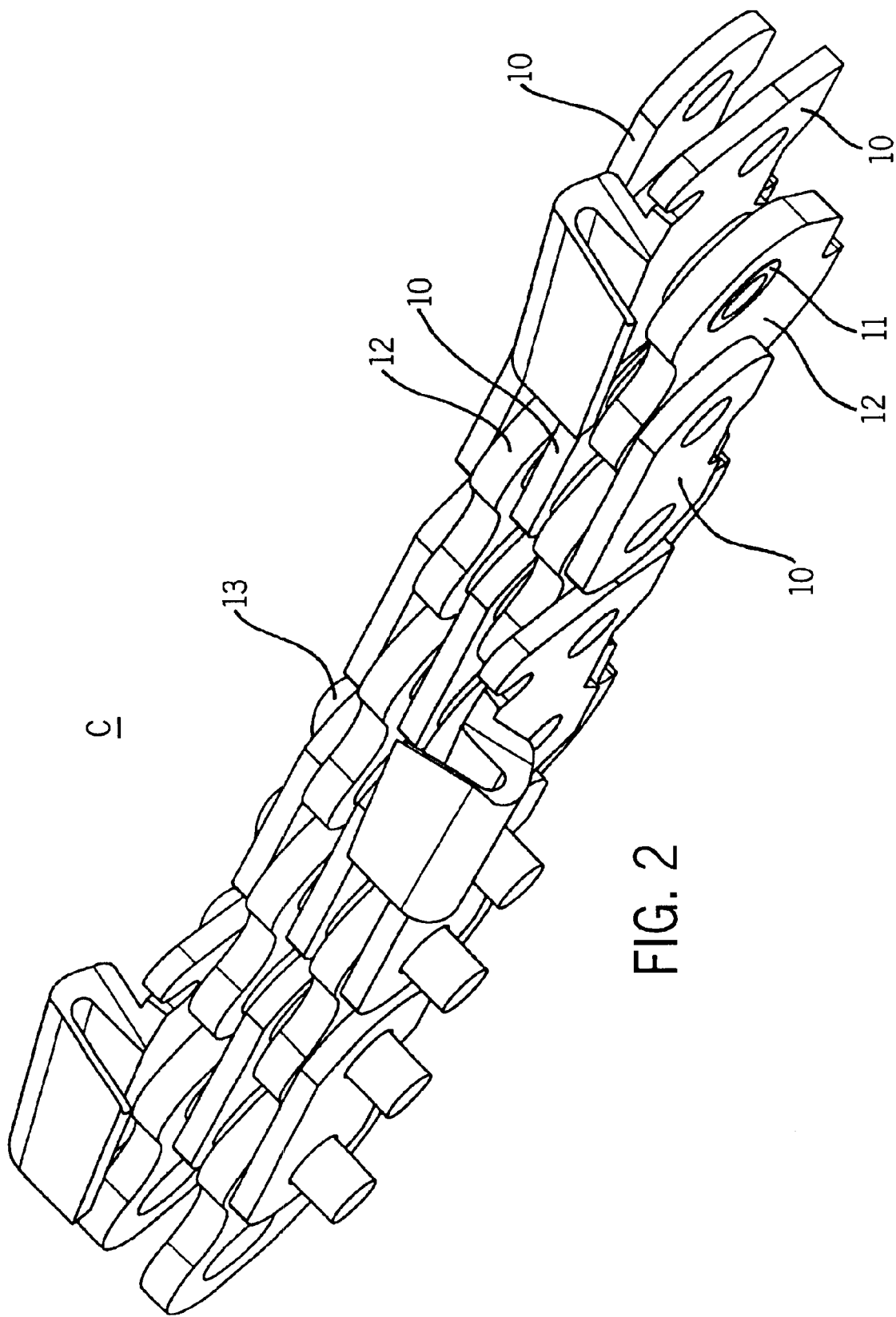
FIG. 2 shows the chain of FIG. 1 when assembled.

FIG. 2 shows the chain C according to FIG. 1 in a partly assembled manner. In FIG. 2, some of the pins are not yet fitted in the chain C. Furthermore, the visible pins 13 are shown in a state before the widening. The tooth links 10 are arranged at suitable distances over the whole width of the chain C, to cut a slot with a corresponding size.

According to one embodiment, the bush ring 11 can also be compressed in the opening of the drive link 12, wherein they are not rotated in relation to each other. Thus, the bush ring 11 must be rotated in relation to the pin 13 as well as the adjacent connecting link 10. Thus, the pin 13 binding the chain C does not compress the chain C but allows the free rotation of the bush ring 11 around the pin 13, for example, between the connecting links 10 of the sequences 1, 3. Compared with the first embodiment of the invention, the tensile load is thus directed solely to the pin 13, and the side edges of the links are worn. In addition to this, the chain is not equally rigid, the fixing of the pins is a more complicated work stage, and also the control of the clearances is more difficult.

According to a second advantageous embodiment of the invention, the chain C also comprises a sixth sequence of drive links fitted one after the other and a seventh sequence of connecting links fitted one after the other. Some of the connecting links in the seventh sequence are provided with a cutting tooth. Bush rings are fitted between these sequences in the above-presented manner. Accordingly, the pin is longer for binding a wider chain. By adding drive link sequences and connecting link sequences in a corresponding manner, it is possible to increase the width of the chain further. The distance between the link sequences can also be affected by the width of the bush ring.

With reference to FIG. 1, the connecting links 10 used as tooth links are arranged at suitable distances in the chain C.

In addition to this, those connecting links 10 of the different sequences which are equipped with teeth 10c must be arranged in an order which is the most efficient in view of cutting. According to an advantageous embodiment, teeth 10c are arranged at every second connecting link 10 in the chain C, wherein in each sequence, every sixth connecting link 10 is a tooth link, in the case of three sequences. In a corresponding manner, every eigth connecting link in each sequence is a tooth link, in the case of four sequences. Seen in the running direction of chain C, the tooth links on the right hand side are preferably right-handed and the tooth links on the left hand side are preferably left-handed. The tooth links in the middle can be right-handed or left-handed. As a special structure, the drive link can also be equipped with teeth. As a special structure, the drive link can be replaced with a connecting link in which the size of the openings corresponds to the openings of the drive link.

In the chain C, the bush rings 11 can also be arranged in such a way that when compared with FIG. 1, one or more bush rings 11 around each pin 13 is turned 180° from its position. Thus, the collar 11b in a bush ring 11 is placed against a drive link 12 or a connecting link 10. By means of the dimensions and the position of the bush ring 11, it is thus easy to adjust the mutual distance between the link sequences. Preferably, the drive link 12 and the outermost tooth link 10 are against each other. It is obvious that the collar 11b in a bush ring 11 according to FIG. 1 can be designed as a separate part, for example as a bush ring which is placed directly around the pin 13 or around the bush ring 11, wherein the inner diameter of the collar is larger. It is possible to place several separate narrow collars next to each other to form a wide collar. It is also possible to fit intermediate rings at different positions on the pin. In view of the assembly and the manufacture, the ring 11 is preferably integral, as shown in FIG. 1. The width of the bush ring 11 can be fitted in such a way that no uncut material is left between the teeth 10c in different sequences during the sawing. Thus, the added cutting width of two adjacent teeth 10c is substantially the width over which the teeth 10c are placed in the chain, i.e., substantially the width of the slot that is formed.

Figure 3:
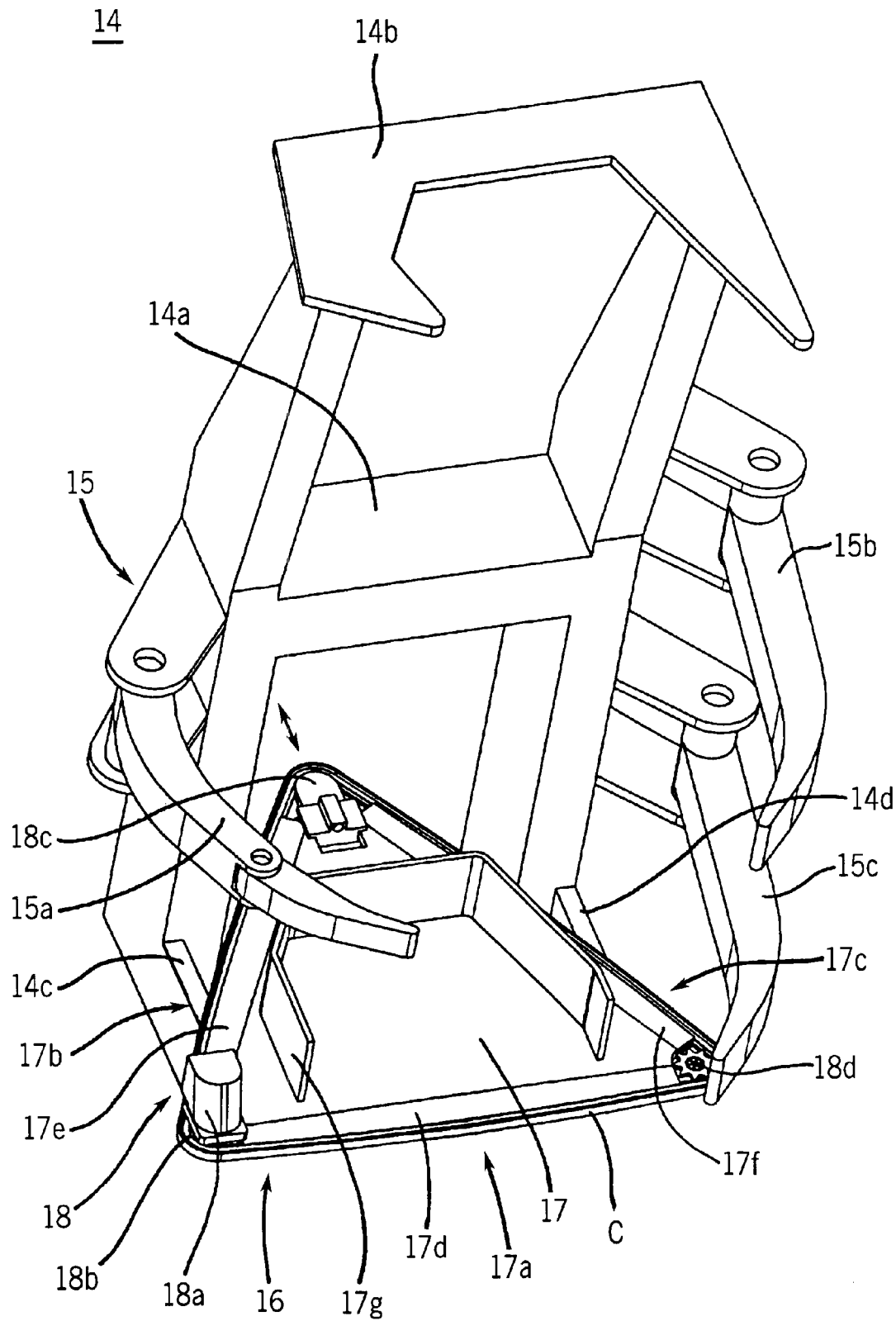
FIG. 3 shows, in a perspective view, a harvesting device according to an advantageous embodiment of the invention, in which the chain of FIG. 1 for a sawing device is applied.

FIG. 3 shows, seen in a diagonal top view, a harvesting device 14 according to an advantageous embodiment, in connection with which it is possible to apply the chain C described above. The device 14 is a feller device which is intended for cutting and felling a vertical growing tree. The tree trunk is supported by grapple means 15 and is sawn by using a motor-driven sawing device 16. The grapple means 15 comprise a pair of grapples 15a and 15b placed on different sides of the tree trunk, as well as a grapple 15c. The grapples are movably coupled by means of a joint to a frame 14a, on its sides, wherein the grapples are moved by means of actuators, such as cylinders driven by a pressurized medium (not shown in the figure). The structure and control of the grapples as well as the structure and operation of a control circuit driven by a pressurized medium are known as such, and therefore a more detailed description will not be necessary. The tree trunk is simultaneously placed in an opening in a support 14b fitted in the upper part of the frame 14a of the device 14. During the sawing, an integrated saw flange structure 17 in the sawing device 16, used as a support plate and a storage plate, is pushed into the slot that is formed. A suitable thickness for the flange 17 is preferably about 10 to 20 mm. A chain C cutting the tree and encircling the flange 17 extends at the front edge 17a of the flange 17. For the sawing, the chain C is exposed at the front edge 17a, but when running on the sides 17b and 17c of the flange 17, the chain C can be protected with various cover structures which are not shown in FIG. 3. The device 14 is arranged to be connected to a working machine moving on a terrain, particularly at the end of its hoisting boom assembly. The device 14 is thus arranged to be swivelled around a substantially horizontal axis in relation to the boom assembly, wherein the device 14 can be swivelled 90° forward from the vertical position of FIG. 3 to fell the tree.

The flange 17 is fitted on top of supporting arms 14c and 14d extending in the lower part of the frame 14a and forward from the frame 14a. In this way, the chain C can also be simply replaced from above and without disassembling it. The chain C is driven by the motor means 18 of the sawing device 16. The motor means 18 comprise, for example, a motor 18a driven by a pressurized medium and fixed to the flange 17, the output shaft of the motor being provided with a drive wheel 18b to move the chain C at a desired speed and with a desired force. The corners of the flange 17 are also provided with idle wheels 18c and 18d to change and guide the direction of motion of the chain C. The second idle wheel 18c is arranged to be movable to adjust the tension of the chain C. The presented flange 17 is triangular, and its middle part is provided with a space for the tree trunk, the space being limited by a wall 17g. The motor can be placed in another corner, and several motors can be provided. Alternatively or additionally, the tensioning of the chain can be provided in connection with the motor or the other idle wheels.

Between the wheels 18b, 18c and 18d at the edge of the flange 17, slipper pads 17d, 17e and 17f are provided, along which the chain C is arranged to glide. The slipper pads are arranged to be replaceable for changing broken and worn slipper pads. The slipper pads can also be changed according to the width of the chain C used, wherein chains C of different widths, according to the need, can be applied in the device 15, which increases the possible uses of the device 15. The slipper pads are equipped with a grooving in which the lower part of the drive link of the chain C extends. According to an advantageous embodiment, the number of adjacent grooves corresponds to the number of drive link sequences in the chain C. It is obvious that the thickness of the slipper pads is limited by the same factors as were presented in connection with the flange structure. With the thicker structure, also the slipper pads are more rigid and more durable. The flange can also be an integral piece whose edge is provided with one or more grooves for the chain. The slipper pads can also form an integral rim-like structure which is connected to the flange and to which the wheels and the motor are possibly connected.

Furthermore, it is obvious for anyone skilled in the art that in the above description, the invention is illustrated by means of an advantageous chain and a harvesting device, and that the invention can also be applied in other uses within the scope of the appended claims.

What is claimed is:

1. A chain for a sawing device, comprising:
   a first sequence of connecting links, of which at least some are cutting teeth, the front and rear ends of the connecting links being provided with openings for connecting,
   a second sequence of drive links fitted between two adjacent connecting link sequences, the front and rear ends of the drive links being provided with openings for connecting, wherein the opening at the rear end of the drive link is centered at the opening in the front end of the connecting links, wherein the opening in the front end of the drive link is centered at the opening of the rear end of the connecting links, wherein the opening of the drive link having a diameter greater than the opening of the connecting link, a third sequence of connecting links, of which at least some are cutting teeth, the front and rear ends of the connecting links being provided with openings for connecting, a bush ring fitted between the first and third sequences of connecting links, around a binding pin, and placed in the opening of the drive link, said bush ring having a diameter greater than the openings of the connecting links, and on at least one side of said drive link, a collar is fitted whose diameter is greater than the opening in said drive link, a fourth sequence of drive links fitted between two adjacent connecting link sequences, the front and rear ends of the drive links being provided with openings for connecting, wherein the opening at the rear end of the drive link is centered at the opening in the front end of the connecting links, wherein the opening in the front end of the drive link is centered at the opening of the rear end of the connecting links, wherein the opening of the drive link having a diameter greater than the opening of the connecting link, and a fifth sequence of connecting links, of which at least some are cutting teeth, the front and rear ends of the connecting links being provided with openings for connecting, a bush ring fitted between the third and fifth sequences of connecting links, around the binding pin, and placed in the opening of the drive link, said bush ring having a diameter greater than the openings of the connecting links, and on at least one side of said drive link, a collar is fitted whose diameter is greater than the opening in said drive link, wherein the binding pin extending through the whole width of the chain and being fitted in the openings.

2. A chain for a sawing device according to claim 1, the chain further comprising a sixth sequence of drive links, and a seventh sequence of connecting links, of which at least some are cutting teeth, wherein a bush ring is fitted between the seventh and the fifth connecting link sequences.

3. A chain for a sawing device according to claim 1, wherein said collar (11b) is fitted in said bush ring (11), and wherein that part of the bush ring which is fitted within the opening of the drive link has at least the same width as the drive link, wherein the free rotation of the drive link around the bush ring is allowed, when the chain is compressed by means of the pin.

4. A chain for a sawing device according to claim 1, the opening of the connecting link having a diameter which substantially corresponds to the diameter of said pin, and the opening of the drive link having a diameter which substantially corresponds to the outer diameter of the bush ring.

5. A chain for a sawing device according to claim 1, said collar having a width which is substantially equal to the distance between the drive link and the connecting link.

6. A chain for a sawing device according to claim 1, said collar being arranged at one end of the bush ring, wherein the joint width of the collar and that part of the bush ring which is fitted in the opening of the drive link corresponds to the distance between the adjacent connecting link sequences.

7. A motor-driven sawing device, comprising a flange structure to be pushed underneath a tree trunk at a sawing location and to support the tree trunk, the flange structure being provided with a cutting endless chain for cutting the tree trunk, the chain being arranged to encircle said flange structure and be driven by motor means, the chain comprising:

a first sequence of connecting links, of which at least some are cutting teeth, the front and rear ends of the connecting links being provided with openings for connecting, a second sequence of drive links fitted between two adjacent connecting link sequences, the front and rear ends of the drive links being provided with openings for connecting, wherein the opening at the rear end of the drive link is centered at the opening in the front end of the connecting links, wherein the opening in the front end of the drive link is centered at the opening of the rear end of the connecting links, wherein the opening of the drive link having a diameter greater than the opening of the connecting link, a third sequence of connecting links, of which at least some are cutting teeth, the front and rear ends of the connecting links being provided with openings for connecting, a bush ring fitted between the first and third sequences of connecting links, around a binding pin, and placed in the opening of the drive link, said bush ring having a diameter which is greater than the openings of the connecting links, and on at least one side of said drive link, a collar is fitted whose diameter is greater than the opening in said drive link, a fourth sequence of drive links fitted between two adjacent connecting link sequences, the front and rear ends of the drive links being provided with openings for connecting, wherein the opening at the rear end of the drive link is centered at the opening in the front end of the connecting links, wherein the opening in the front end of the drive link is centered at the opening of the rear end of the connecting links, wherein the opening of the drive link having a diameter greater than the opening of the connecting link, and a fifth sequence of connecting links, of which at least some are cutting teeth, the front and rear ends of the connecting links being provided with openings for connecting, a bush ring fitted between the third and fifth sequences of connecting links, around the binding pin, and placed in the opening of the drive link, said bush ring having a diameter greater than the openings of the connecting links, and on at least one side of said drive link, a collar is fitted whose diameter is greater than the opening in said drive link, wherein the binding pin extending through the whole width of the chain and being fitted in the openings.

8. A sawing device according to claim 7, wherein the chain is fitted to extend at the front edge of the flange structure and to be pushed into a tree trunk to be cut in front of said flange structure.

9. A sawing device according to claim 7, wherein the flange structure is provided with a freely rotatable idle wheel and a motor-driven wheel to guide the run of the chain.

10. A sawing device according to claim 7, wherein the sawing device further comprising a frame structure which is provided with movable grapple means for supporting a tree trunk, and said flange structure being arranged to support the tree trunk.

11. A sawing device according to claim 10, arranged connectable to a working machine moving on a terrain, particularly at the end of its hoisting boom assembly.

12. A sawing device according to claim 7, further comprising replaceable slipper pads along which the chain is arranged to glide and having a grooving in which the lower part of the drive link runs.

13. A sawing device according to claim 10, further comprising supporting arms extending in the lower part of the frame and forward from the frame, wherein the flange is fitted on top of the supporting arms.

14. A sawing device according to claim 7, wherein the flange is triangular, wherein the corners of the flange are provided with a freely rotatable idle wheel and a motor-driven wheel, and wherein the front edge of the flange is provided with replaceable slipper pad.

* * * * *